United States Patent
Pronkine

(10) Patent No.: US 6,665,019 B1
(45) Date of Patent: Dec. 16, 2003

(54) METHOD AND APPARATUS FOR SPREAD SPECTRUM CLOCKING OF DIGITAL VIDEO

(75) Inventor: Viatcheslav Pronkine, Edgewater, NJ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 463 days.

(21) Appl. No.: 09/626,188

(22) Filed: Jul. 28, 2000

(51) Int. Cl.[7] .............................. H04N 5/06; H04N 5/21
(52) U.S. Cl. ........................ 348/540; 348/516; 348/537; 348/470
(58) Field of Search ................................ 348/537, 536, 348/540, 521, 516, 501, 470, 530, 531, 507, 819, 820, 724, 725, 726; 375/130, 376; 345/208, 213; 315/85, 10

(56) References Cited

U.S. PATENT DOCUMENTS

| | | | |
|---|---|---|---|
| 4,303,942 A | 12/1981 | Fukuda et al. .............. 358/147 |
| 5,140,610 A * | 8/1992 | Holliday et al. ............ 375/131 |
| 5,157,308 A * | 10/1992 | Rindal ......................... 315/85 |
| 5,268,760 A | 12/1993 | Suyama ....................... 358/167 |
| 5,541,646 A * | 7/1996 | Huang ......................... 348/177 |
| 5,610,955 A * | 3/1997 | Bland .......................... 375/376 |
| 5,631,920 A * | 5/1997 | Hardin ........................ 375/130 |
| 5,659,339 A * | 8/1997 | Rindal et al. ............... 345/212 |
| 5,736,893 A * | 4/1998 | Puckette et al. ............ 327/551 |
| 5,757,338 A | 5/1998 | Bassetti et al. ............. 345/3 |
| 5,943,382 A * | 8/1999 | Li et al. ...................... 375/376 |
| 6,020,939 A * | 2/2000 | Rindal et al. ............... 348/805 |
| 6,046,735 A * | 4/2000 | Bassetti et al. ............. 345/204 |
| 6,057,809 A * | 5/2000 | Singhal et al. .............. 345/3.3 |
| 6,167,103 A * | 12/2000 | Hardin ........................ 375/376 |
| 6,292,507 B1 * | 9/2001 | Hardin et al. .............. 375/130 |

FOREIGN PATENT DOCUMENTS

| | | | |
|---|---|---|---|
| EP | 0447210 B1 | 9/1991 | ............ H03C/5/92 |
| EP | 0801510 A2 | 10/1997 | .......... H04N/17/00 |
| EP | 0801510 A3 | 10/1997 | .......... H04N/17/04 |
| WO | WO9719554 | 5/1997 | ............ H04N/7/10 |

* cited by examiner

Primary Examiner—John Miller
Assistant Examiner—Jean W. Désir
(74) Attorney, Agent, or Firm—Russell Gross

(57) ABSTRACT

In accordance with one embodiment of the invention a spread spectrum pixel clock signal is generated to spread out the frequency bandwidth within which the peak emission of an electromagnetic interference signal occurs, so as to decrease the peak electromagnetic emission level. In one embodiment of the invention, this objective is accomplished by employing the horizontal synchronization signal of a video image to generate a periodic waveform that modulates the pixel clock reference input, such that clock signal pulses are spread out within each scan line. The modulation signal is synchronized with the horizontal synchronization signal such that each pixel location remains consistent in the horizontal and time domain.

17 Claims, 4 Drawing Sheets

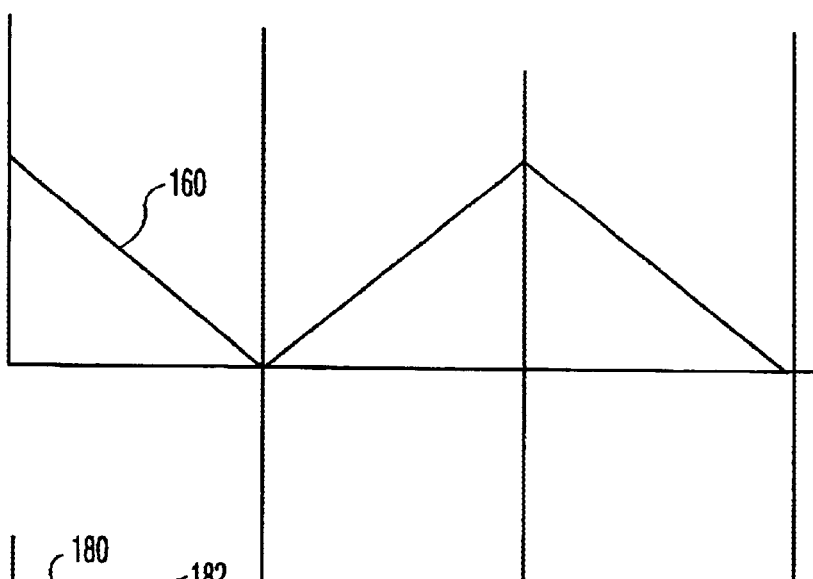
FIG. 4
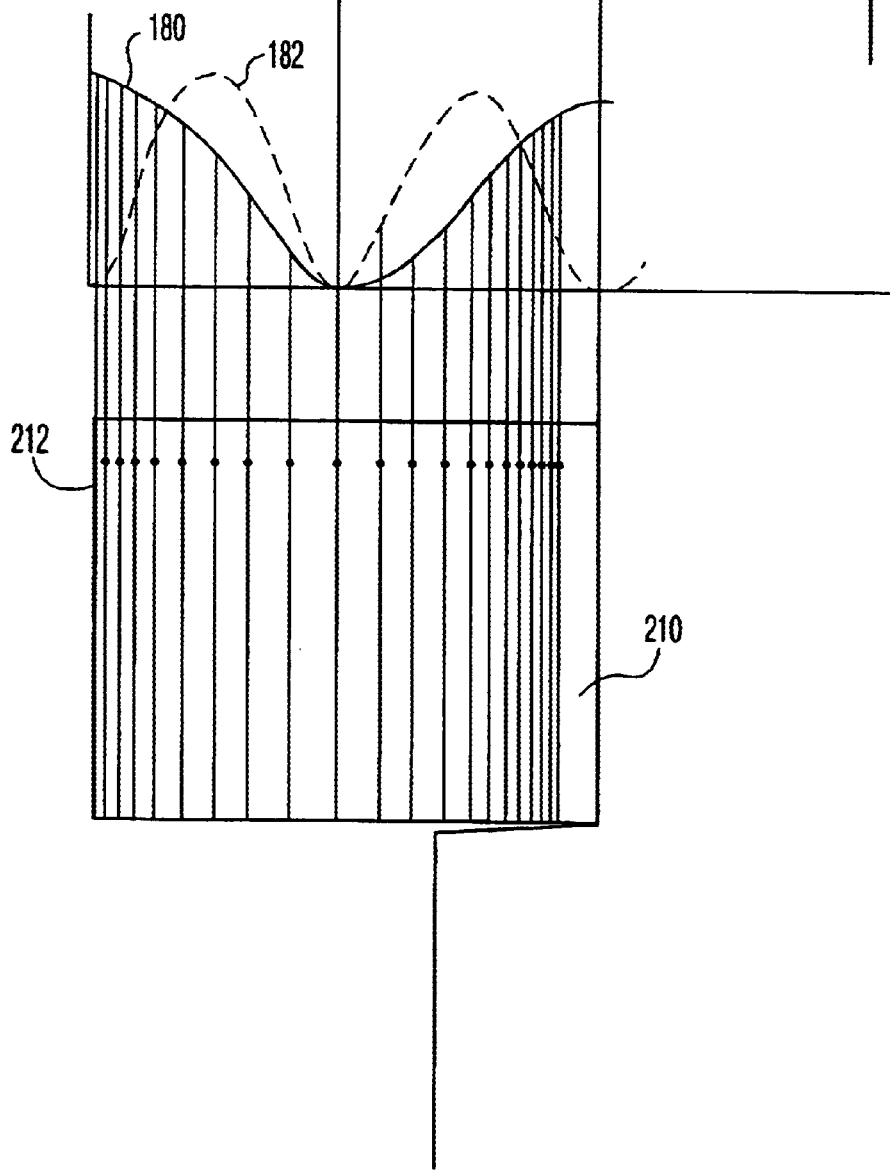
FIG. 5
FIG. 6

METHOD AND APPARATUS FOR SPREAD SPECTRUM CLOCKING OF DIGITAL VIDEO

FIELD OF THE INVENTION

This invention relates to signal clocking and more specifically to signal clocking of digtial video to substantially reduce peak electromagnetic emissions.

BACKGROUND OF THE INVENTION

Digital television technology has become increasingly popular within the last few years. However, digital televisions employ wide, high speed digital busses that produce electromagnetic interference (EMI) signals, which may exceed the emission limits set forth by government regulatory standards, such as those set by Federal Communications Commission (FCC).

A large component of EMI in digital televisions is introduced by the harmonics of the video sampling clock, and the wide data buses associated with that clock. Those harmonics can cause major EMI problems in the digital processing stage of the television set, as well as "leaking" through to the following analog stages. Typically, in order to comply with the EMI emission requirements, many digital TVs employ electromagnetic shielding techniques. However, these shielding techniques add to the overall cost of the TV set. They also add to the overall weight and size of the TV set.

Furthermore, EMI leaking signals that travel through the analog stage of the TV set are amplified by the cathode ray tube (CRT) driver electronic. The amplified EMI signals can then radiate very efficiently through the large aperture of the CRT itself, where shielding, or other methods of reducing electromagnetic interference (EMI) is almost impossible without degradation of the picture quality.

Thus, there is a need for a system and a method that reduces electromagnetic interference emissions in a digital TV without the shortcomings described above.

SUMMARY OF THE INVENTION

In accordance with one embodiment of the invention a spread spectrum pixel clock signal is generated to spread out the frequency bandwidth within which the peak emission of an electromagnetic interference signal occurs, so as to decrease the peak electromagnetic emission level. In one embodiment of the invention, this objective is accomplished by employing the horizontal synchronization signal of a video image to generate a periodic waveform that modulates the pixel clock reference input, such that clock signal pulses are spread out within each scan line. The modulation signal is however synchronized with the horizontal synchronization signal also referred to as the horizontal scanning signal so that each pixel location remains consistent in the horizontal and time domain.

In accordance with one embodiment of the invention, the pixel clock reference input signal is frequency modulated (FM) by a signal which is a coherent harmonic of the fundamental frequency of the horizontal scanning signal.

In accordance with another embodiment of the invention, a waveform synthesizer is configured to receive the horizontal synchronization signal of a video signal from a digital video transmission bus so as to generate the required frequency modulation FM signal. A pixel clock reference signal is provided to a phased lock loop (PLL) circuit to generate a pixel clock reference signal. The PLL is also configured to receive the frequency modulation signal via a high pass filter so as to vary the frequency of the pixel clock reference input in accordance with the waveform of the signal generated by the waveform synthesizer. As such the PLL functions as a modulating circuit that modulates the pixel clock signal received from pixel clock generator 116 by a modulating signal generated by waveform synthesizer 120. The frequency modulated signal generated at the output port of the phase lock loop is then provided instead of the pixel clock reference signal for driving the following stages of the video system path. This frequency modulated signal referred to as the spread spectrum pixel clock signal substantially reduces the EMI peak emission in the digital video image bus.

BRIEF DESCRIPTION OF THE DRAWINGS

FIG. 4 illustrates a plot of an exemplary waveform signal generated by a waveform synthesizer employed by the spread spectrum clock signal generator in accordance with one embodiment of the invention.

FIG. 5 illustrates other examples of the possible waveform signals generated by the waveform synthesizer employed by the spread spectrum clock signal generator in accordance with one embodiment of the invention.

FIG. 6 illustrates an exemplary display screen with pixel positions arranged in columns in accordance with one embodiment of the invention.

DETAILED DESCRIPTION OF THE DRAWINGS

Figure 1:
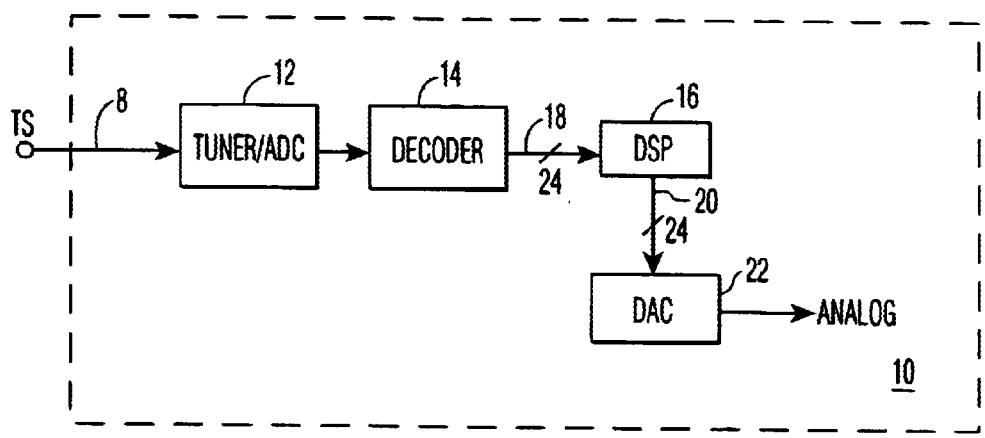
FIG. 1 illustrates a block diagram of a prior art digital TV, including two exemplary buses that generate electromagnetic interference signal emissions.

FIG. 1 illustrates exemplary portions of a digital television 10 that contribute to the emission of electromagnetic interference signals. A transmission signal is provided to an input port 8 of digital television 10 and forwarded to an input terminal of a tuner circuit 12.

Tuner circuit 12 is configured to provide a local oscillating frequency signal that is employed to tune into a corresponding channel contained within the television signal provided to digital television 10 and convert the tuned television signal to a digital format via an analog to digital converter (ADC), as well known by those skilled in the art. An output port of tuner circuit 12 is coupled to an input port of a decoder 14. It is noted that decoder 14 is configured to perform the necessary decoding functions in accordance with the standards that govern the transmission of the particular television signal provided to television 10, such as the MPEG standard.

The output port of decoder 14, for instance an MPEG decoder, is coupled via a data bus 18 to a digital signal processing module 16, such as a color space convertor or a gamma corrector. Typically data bus 18 is 24 bits wide carrying data signals having a frequency of 75 Mhz as employed in video formats such as ATSC 1080i. The output port of digital signal processing module 16 is provided to an input port of a digital to analog converter 22 via another data bus 20, which is 24~30 or more bits wide. The 75 Mhz data rate in buses 18 and 20 can cause additional harmonics in the range starting from the fundamental frequency and higher. Furthermore, the peak electromagnetic emission generated within these buses can exceed the limits set forth by regulatory standards, such as those imposed by FCC.

Figure 2:
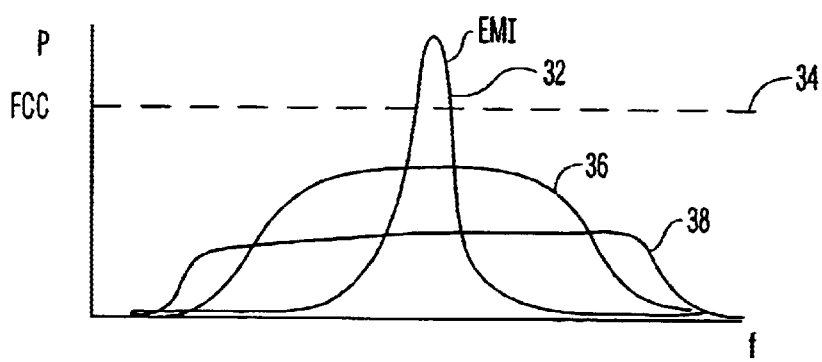
FIG. 2 is a plot of peak emissions of electromagnetic interference signals generated before and after employing spread spectrum clock signal in accordance with one embodiment of the present invention.

FIG. 2 illustrates a power frequency spectrum of a radiated electromagnetic signal 32, whose peak emission exceeds the EMI power threshold 34 as set forth for example by the FCC. In order to reduce this peak EMI power, in accordance with one embodiment of the invention a spread spectrum pixel clock signal generator is provided as illustrated in FIG. 3.

Figure 3:
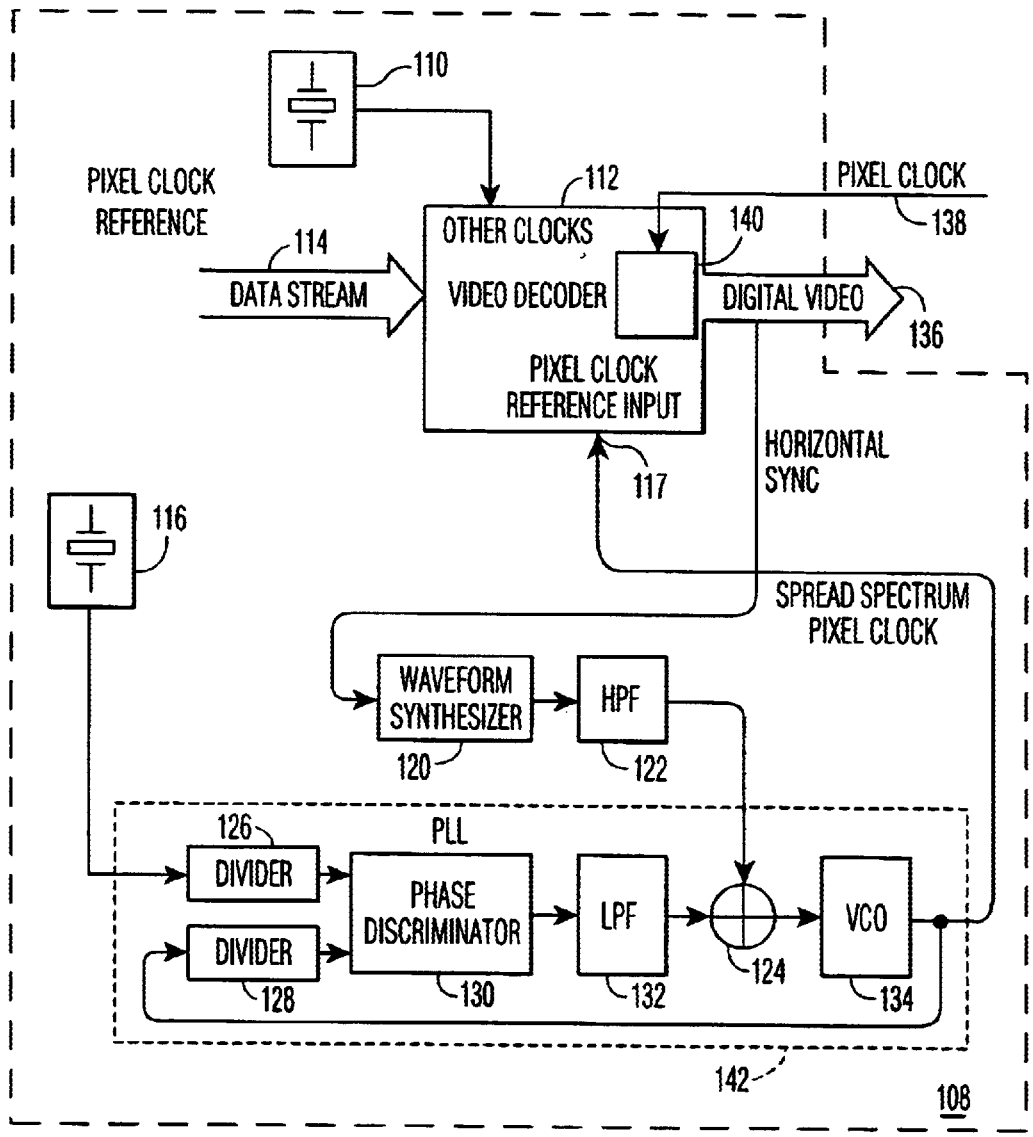
FIG. 3 illustrates a block diagram of a spread spectrum clock signal generator in accordance with one embodiment of the present invention.

Thus, FIG. 3 illustrates a spread spectrum clock signal generator 108 that is configured to receive a digital data stream over bus 114. The data stream is provided to a video decoder 112, which is configured to decode the received data. Video decoder 112, in accordance with one embodiment of the invention includes a buffer 140, such as a first-in-first-out (FIFO) buffer 140 or a frame buffer, which is configured to store and forward pixel data to the following stage of the television receiver via a digital video bus 136 at a pixel clocking signal provided through line 138. It is noted that line 138 is illustrated here as a separate line. However, in accordance with other embodiments of the invention, line 138 is part of video bus 136. Each pixel is displayed on a display screen of the television set in accordance with the pixel clocking signal provided through line 138.

Digital video bus 136 also contains a horizontal synchronizing pulse signal having a period "T". The horizontal synchronizing pulse signal is employed by the television set to generate a scanning electron beam signal, for example for CRT type displays. The scanning electron beam signal has a corresponding horizontal scanning frequency during which each horizontal line on the display screen is processed. As a result during each horizontal scan a position of each of pixel is displayed on the television display screen. It is noted that although the embodiment described here in reference with FIG. 3 relates to a television set, the invention is not limited in scope in that respect and the principles of the present invention can be employed in other type of video displays.

Video decoder 112 includes an input port 117 that is configured to receive a pixel clock reference signal. Clock signal source 116, in accordance with one embodiment of the invention is a crystal oscillator, however, the invention is not limited in scope in that respect. Video decoder 112 includes input ports for other clocks configured to receive clock signals from a clock signal generator, such as 110.

In accordance with one embodiment of the invention, spread spectrum pixel clock generator 118 includes a phase lock loop 142, which is configured to receive the clock signal provided by clock signal source 116. Phase lock loop 142 includes a divider circuit 126 having an input port that receives the clock signal and an output port coupled to an input port of a phase discriminator 130. The other input port of phase discriminator 130 is configured to receive a signal from an output port of a divider 128.

The output port of phase discriminator 130 is coupled to an input port of a low pass filter 132. Low pass filter 132 in turn provides a signal to an input port of a summing circuit 124. The output port of summing circuit 12 is coupled to an input port of a voltage controlled oscillator 134. A feedback signal line provides a signal generated by voltage control oscillator 134 to an input port of divider 128. Phase lock loop 142 is employed to stabilize the phase accumulation for each scan line as well as the center frequency of the clock signal generated by the PLL circuitry.

Spread spectrum pixel clock generator 118 also includes a waveform synthesizer 120, which is configured to receive the horizontal synchronization pulse signal that is provided in digital video bus 136. The horizontal synchronization pulse signal can be also extracted from digital video bus 136, in accordance with techniques well known in the art. An output port of waveform synthesizer 120 is coupled to an input port of a high pass filter 122. An output port of high pass filter 122 is in turn coupled to a second input port of summing circuit 124. It is noted that the invention is not limited in scope to the use of waveform synthesizer. For example other circuits for generating waveforms can be used as is well known by those skilled in the art.

The output port of voltage controlled oscillator 134 generates a spread spectrum pixel clock signal, which is provided to pixel clock reference input port 117 of video decoder, and more specifically to a frame buffer or a FIFO 112.

During operation, waveform synthesizer 120 generates a modulating signal, which is a coherent harmonic or a combination of the coherent harmonics of the horizontal scanning frequency. FIG. 4 illustrates a frequency modulation signal 160, which has a triangular shape with a period "T." As such, signal 160 causes the frequency of pixel clock signal generated by voltage control oscillator 134 to change. For example, when the signal level of frequency modulation signal 160 is high, the frequency of the pixel clock signal is high (if positive FM is used), whereas when the signal level of frequency modulation signal 160 is lower, the frequency of the pixel clock signal is also lower. In effect, during the time period wherein the signal level of frequency modulation signal decreases the pixels spread apart, and during the time period wherein the amplitude of frequency modulation signal increases the pixels squeeze together, as illustrated by pixel locations of vertical group of pixels, as known as, columns pixels 212 on display screen 210 in FIG. 6.

Figure 7:
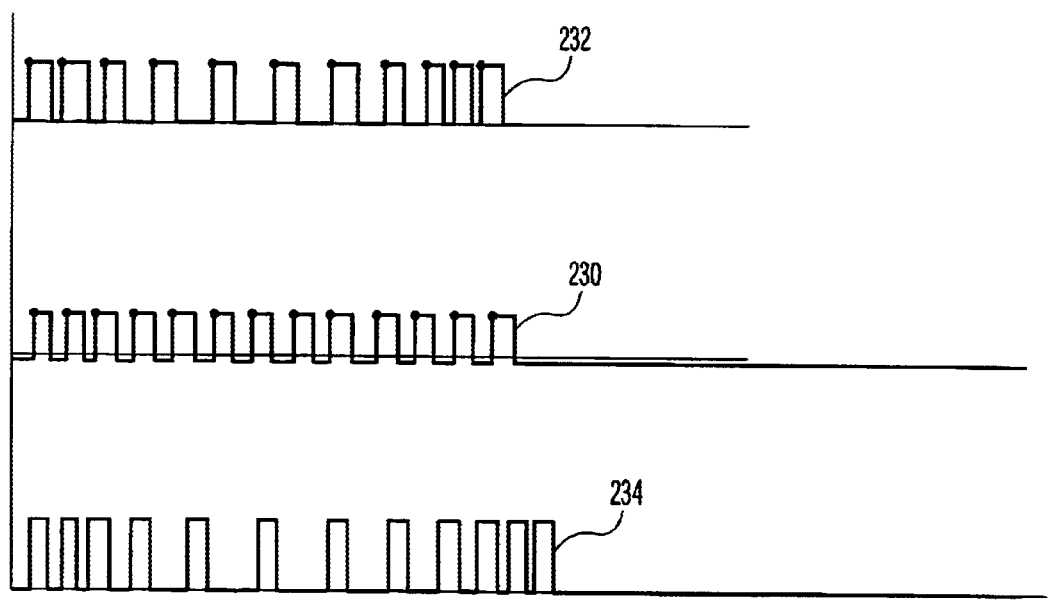
FIG. 7 illustrates exemplary waveforms of pixel clock signals generated in accordance with one embodiment of the invention.

FIG. 7 illustrates a pixel clock signal 230 without the spread spectrum arrangement disclosed above, compared with pixel clock signals 232 or 234 with the effect of spread spectrum arrangement as disclosed above.

FIG. 5 illustrates some of the other exemplary waveforms that can be generated by waveform synthesizer 120 in accordance with other embodiments of the invention, although the invention is not limited in scope in that respect and other types of waveforms can be employed. For example waveform synthesizer 120 generates a parabolic frequency modulation signal 180 having a period "T," or generates a parabolic frequency modulation signal 182 having a period "T/2."

It is noted that because the frequency modulating signal that modulates the pixel clock signal is triggered by the horizontal synchronization pulse and as such has the same frequency as the horizontal synchronization signal or its harmonics, each pixel location on each horizontal line on the display screen remains consistent in reference with the pixels in the picture (or) frame which results in consistency in horizontal domain. Furthermore, each pixel location in each frame also remains consistent in reference with the other frames, which results in consistency in time domain. It is noted that lack of consistency in horizontal or time domains can cause pixel jitters, distortion, and overall degradation of the picture quality.

It is noted that high pass filter 122 and low pass filter 132 are configured such that the frequency spectrums of the frequency modulation signal generated by waveform synthesizer 120 and the frequency of the phase lock loop feedback signal do not overlap. Thus, the frequency modulating signal is limited in the low band for the unmodulated reference clock, such that the average frequency of the spread spectrum clock signal over the period of nT is the same as the pixel clock signal frequency without the spread spectrum arrangement.

It is further noted that in accordance with one embodiment of the invention, the typical amount of frequency deviation for a spread spectrum clock signal is such that no significant amount of distortion can be perceived by an average observer. This frequency deviation may range between 1% to 3%, although the invention is not limited in scope in that respect. This follows because in display systems the visibility threshold for static distortion is above 5%, which leaves sufficient overhead for distortion tolerance. In accordance with another embodiment of the invention, in the event that larger frequency deviations in the spread spectrum clock signal is required, CRT static correction circuits can be employed as commonly known by those skilled in the art.

The spread spectrum clock signals generated by the principles of the present invention exhibit a substantially lower peak emission of electromagnetic interference generated by digital video circuitry. This follows because the power of the electromagnetic interference signal spreads over a wider frequency range when the pixel clock is spread as described above.

FIG. 2 illustrates power spectrums of electromagnetic interference signals 36 and 38 having peak energy emissions below the imposed threshold 34, after generating a spread spectrum pixel clock signal. As illustrated, signal 38 corresponds with a clock pulse signal having higher modulation (more spreading of the clock) than a clock pulse signal that produces an electromagnetic emission illustrated as signal 36.

Thus, the present invention overcomes many problems associated with transmission of video data over transmission buses located in a digital television set or other digital display devices. By modulating the pixel clock frequency with a signal that is a coherent harmonic or a combination of the coherent harmonics of the horizontal scanning frequency, it is possible to provide a spread spectrum clock signal that reduces the peak EMI emissions and at the same time does not cause pixel horizontal jitters and/or picture quality degradation.

I claim:

1. A system for spread spectrum clocking a video image comprising:
    a video image source configured to provide digital image data over a data bus, said digital image data including a horizontal synchronization signal;
    a pixel clock signal source configured to generate a pixel clock signal corresponding to pixel information contained in said digital image data;
    a waveform generator coupled to said data bus so as to receive information corresponding to said horizontal synchronization signal, said waveform generator configured to provide a modulating signal having a frequency that is a harmonic of frequency of said horizontal synchronization signal;
    a modulating circuit coupled to said waveform generator and said pixel clock signal source configured to modulate said pixel clock signal source by said modulating signal so as to generate a spread spectrum pixel clock signal.

2. The system in accordance with claim 1 further comprising a video image buffer coupled to said data bus, for storing video image data.

3. The system in accordance with claim 1 wherein said spread spectrum pixel clock signal is coupled to said video image buffer so as to transmit said stored video image data at said spread spectrum pixel clock rate.

4. The system in accordance with claim 1 wherein said modulating circuit comprises a phase lock loop configured to receive said pixel clock signal generated by said pixel clock signal source.

5. The system in accordance with claim 4, wherein said phase lock loop further comprises a summing circuit configured to receive said modulating signal so as to modulate said pixel clock signal received from said pixel clock signal source.

6. The system in accordance with claim 5, further comprising a high pass filter coupled to output port of said waveform synthesizer and an input port of said summing circuit.

7. The system in accordance with claim 6 wherein said phase lock loop further comprises a voltage controlled oscillator configured to provide said spread spectrum pixel clock signal.

8. A system for spread spectrum clocking a video image comprising:
    a video decoder configured to receive a video image data stream, said video decoder including a buffer for storing decoded digital video data;
    a data bus coupled to said video decoder configured to transmit said stored decoded digital video data including information corresponding to a horizontal synchronization signal relating to said digital video data;
    a pixel clock signal source configured to generate a pixel clock signal corresponding to pixel information contained in said digital image data;
    a waveform generator coupled to said data bus so as to receive said information corresponding to said horizontal synchronization signal, said waveform generator configured to provide a modulating signal having a frequency that is a harmonic of frequency of said horizontal synchronization signal; and
    a modulating circuit coupled to said waveform generator and said pixel clock signal source configured to modulate said pixel clock signal source by said modulating signal so as to generate a spread spectrum pixel clock signal, wherein said digital video data is transmitted from said buffer at said spread spectrum pixel clock signal rate.

9. The system in accordance with claim 8 wherein said modulating circuit comprises a phase lock loop configured to receive said pixel clock signal generated by said pixel clock signal source.

10. The system in accordance with claim 9, wherein said phase lock loop further comprises a summing circuit configured to receive said modulating signal so as to modulate said pixel clock signal received from said pixel clock signal source.

11. The system in accordance with claim 10, further comprising a high pass filter coupled to output port of said waveform synthesizer and an input port of said summing circuit.

12. The system in accordance with claim 11 wherein said phase lock loop further comprises a voltage controlled oscillator configured to provide said spread spectrum pixel clock signal.

13. A method for generating a spread spectrum clocking signal for a video image data transmitted in a data bus comprising the steps of:

retrieving a horizontal synchronization signal from said video image data bus;

generating a pixel clock signal corresponding to pixel information contained in said digital image data;

providing a modulating signal having a frequency that is a harmonic of frequency of said horizontal synchronization signal; and modulating said pixel clock signal by said modulating signal so as to generate said spread spectrum pixel clock signal.

14. The method in accordance with claim 13 further comprising the step of storing said video image data in a buffer.

15. The method in accordance with claim 14 further comprising the step of transmitting said stored video image data at said spread spectrum pixel clock rate.

16. The system in accordance with claim 15 wherein said modulating step further comprises the step of providing said pixel clock signal to a phase lock loop.

17. The system in accordance with claim 16 further comprising the step of receiving said modulating signal so as to modulate said pixel clock signal received from said pixel clock signal source.

* * * * *